United States Patent
Dostal et al.

[15] 3,700,304
[45] Oct. 24, 1972

[54] OPTICAL SWITCH MECHANISM

[72] Inventors: Frank Dostal; Charles Badowski, both of New York, N.Y.

[73] Assignee: Bulova Watch Company, Inc., New York, N.Y.

[22] Filed: Aug. 3, 1970

[21] Appl. No.: 60,249

[52] U.S. Cl. ................350/6, 73/70.2, 350/285, 324/80
[51] Int. Cl. ..............................................G02b 17/00
[58] Field of Search............350/6, 7, 162, 285, 288; 178/7.6; 73/70.2; 324/80

[56] References Cited

UNITED STATES PATENTS

| | | | |
|---|---|---|---|
| 1,438,974 | 12/1922 | Wente | 350/6 |
| 3,549,244 | 12/1970 | Shaffer | 350/6 |
| 2,920,529 | 1/1960 | Blythe | 350/285 |
| 3,087,373 | 4/1963 | Poor et al. | 350/7 |

Primary Examiner—David Schonberg
Assistant Examiner—Michael J. Tokar
Attorney—Michael Ebert

[57] ABSTRACT

An optical switching mechanism including a vibrator having a pair of parallel reeds which are sustained in vibration at a rate determined by the resonance characteristic of the vibrator, the free ends of the reeds being ganged together by a headpiece. The arrangement is such that as the reeds sway simultaneously from side to side, the headpiece is caused to undergo a translating movement substantially free of an arcuate component. Mounted on the headpiece is a triangular reflecting element whose apex, in the static state of the vibrator, is aligned with a beam of incident radiant energy, whereby as the element, in the dynamic state, shifts to either side of the beam, the beam is deflected by the angled faces of the element in alternate directions.

9 Claims, 14 Drawing Figures

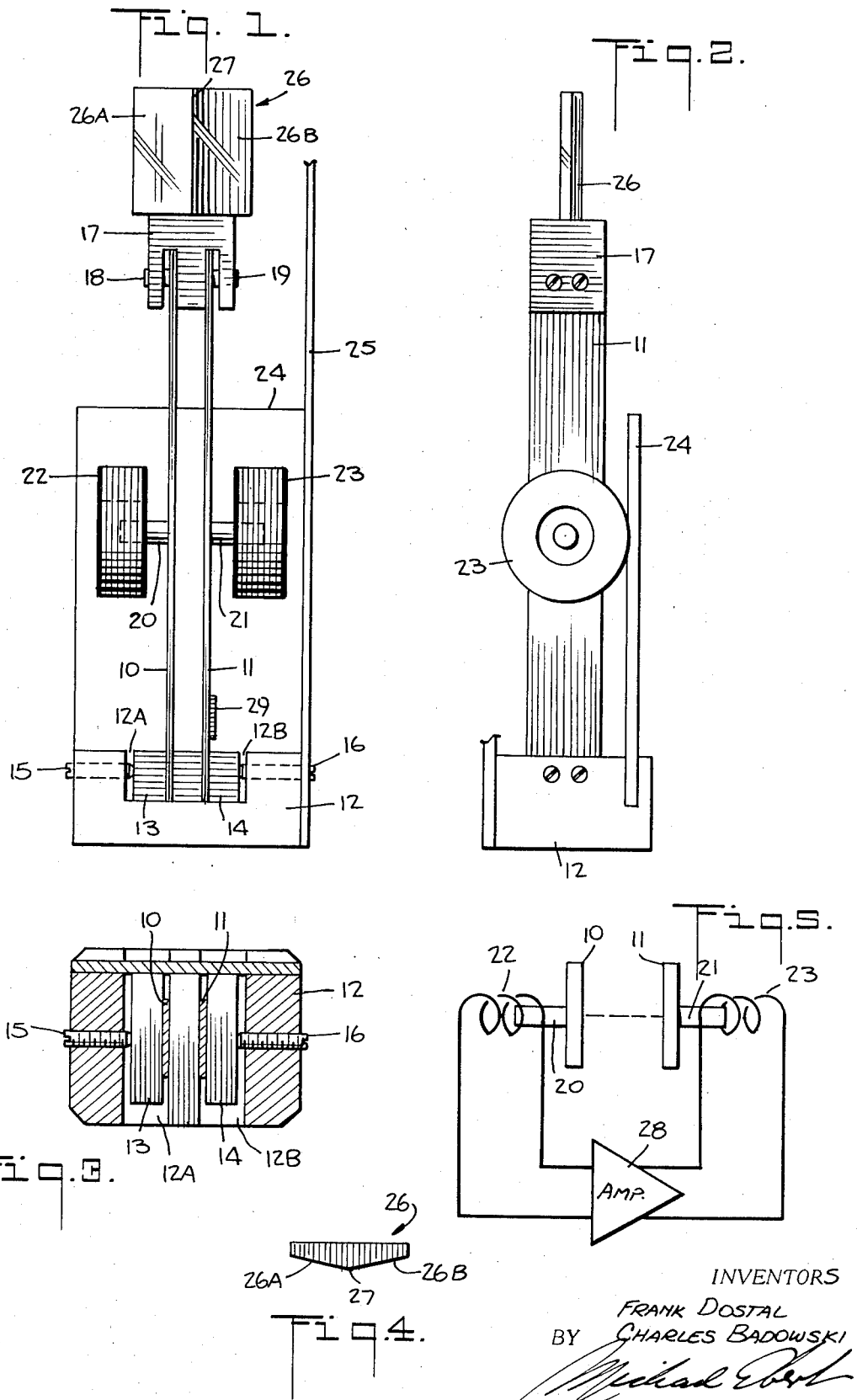

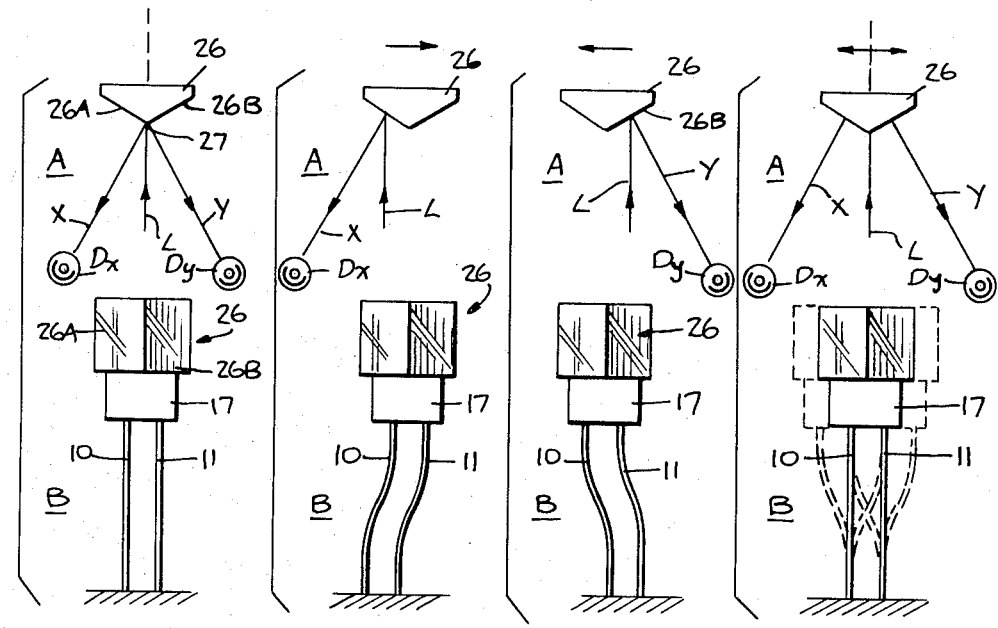
Fig.6. Fig.7. Fig.8. Fig.9.
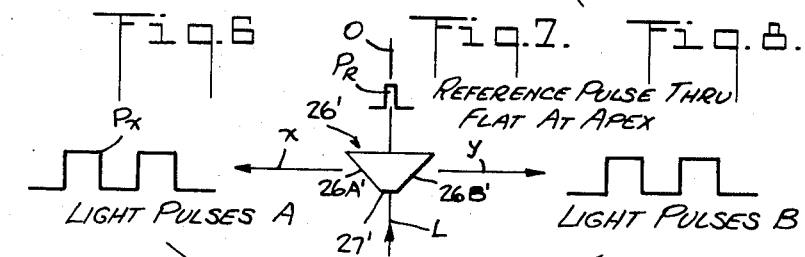
Fig.13. Fig.10.
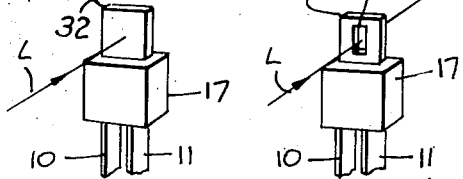
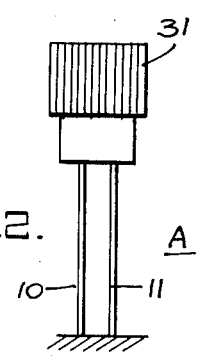
Fig.14.
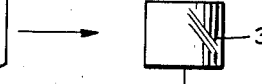
Fig.11.
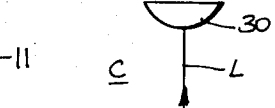

OPTICAL SWITCH MECHANISM

BACKGROUND OF THE INVENTION

This invention relates generally to optical switching devices, and more particularly to a device in which an optical reflecting element is mounted on a mechanical resonator and is adapted to direct an incident beam in alternate directions.

Various forms of optical devices are currently in use to chop, pulse, scan, sweep or otherwise modulate a beam of radiant energy. Such devices are incorporated in mass spectrometers, bolometers, star trackers, colorimeters, horizon sensors and in various instruments which utilize or analyze nuclear, X-Ray or laser beams, or beams in the visible, ultra-violet or infra-red region.

Existing optical devices for this purpose usually make use of motor-driven discs, drums, mirrors or prisms. Devices using motors are relatively big and heavy, and have large power requirements, particularly at higher frequencies, thus necessitating extra size and weight provisions for inverters or similar power supplies. Also in use are electromagnetically actuated armature devices in which the pivoted armature is mounted on jeweled bearings. Optical modulators of these types are relatively inefficient and unstable. Moreover, they are lacking in shock resistance, they inevitably produce "jitter" due to microscopic shake or rattle at their bearings, and they have other drawbacks which limit their usefulness.

It is also known to use resonant tuning forks to vibrate optical elements, and while such forks overcome many of the drawbacks found in motor-driven choppers, they are comparatively expensive and are unable to produce large angular excursions of the optical elements when operated at low power.

The primary concern of the present invention is beam-switching mechanisms; that is, mechanisms adapted to direct a beam of incident radiant energy such as a beam of monochromatic radiation or a laser ray, in alternate paths. One available form of mechanism for this purpose is a motor-driven disc bearing multiple mirrors which are arranged to reflect an incident beam in alternative directions. But, as pointed out above, motor-driven optical devices are cumbersome and have relatively large power requirements.

Another approach to the problem is to make use of a reflecting mirror borne on the tine of a vibrating tuning fork. But, because the tine, in swinging from side to side, operates within an arc, this results in an angular motion of the mirror and gives rise to undesirable smearing of the reflected beam to produce an unwanted scanning action. This drawback is aggravated with large mirror angles as well as at increasing fork amplitudes.

SUMMARY OF THE INVENTION

In view of the foregoing, it is the primary object of this invention to provide an improved optical switching mechanism which functions to deflect a beam of radiant energy in alternate directions.

More specifically, it is an object of the invention to provide a mechanism of the above type which utilizes a double reed adapted to reciprocate a reflecting element from side to side without an accompanying arcuate component of motion.

Also an object of the invention is to provide a vibrating mechanism of the double-reed type which is characterized by high optical efficiency in that virtually all of the beam energy is utilized in the course of switching, no significant portion of the incident beam being omitted from the alternate reflecting paths.

Still another object of the invention is to provide an optical switching mechanism which is compact, lightweight, and has exceptionally low power requirements, in the order of 75 milliwatts.

Briefly stated, these objects are attained in an optical switching mechanism including a vibrator having a pair of parallel reeds whose free ends are ganged together by a headpiece whereby, as the driven reeds are caused to swing simultaneously from side to side, the headpiece is caused to undergo a translational movement substantially free of an arcuate component of motion. Mounted on the headpiece is a reflecting element having a triangular formation defined by an apex and angled faces, the apex, in the static state, being aligned with an incident beam of radiant energy whereby, as the element vibrates, the beam alternately strikes the faces and is reflected thereby.

OUTLINE OF DRAWING

For a better understanding of the invention, as well as other objects and further features thereof, reference is made to the following detailed description to be read in conjunction with the accompanying drawing, wherein:

FIG. 1 is a front elevational view of an optical switching mechanism in accordance with the invention;

FIG. 2 is a side elevational view of the mechanism;

FIG. 3 is a plan view of the base of the mechanism;

FIG. 4 is a plan view of the reflecting element;

FIG. 5 schematically illustrates the associated electronic drive circuit for the mechanism;

FIGS. 6A and 6B illustrate the position of the reflecting element and its associated double reed, in the static state;

FIGS. 7A and 7B illustrate the position of the element and its associated double reed when deflected to the right;

FIGS. 8A and 8B illustrate the position of the element and its associated double reed when deflected to the left;

FIGS. 9A and 9B illustrate the position of the element and its associated double reed, in the dynamic state, vibrating to the left and right;

FIG. 10 illustrates a modified form of reflecting element to produce right-angle switching;

FIGS. 11A, 11B, 11C, 11D and 11E illustrate a semicylindrical reflecting element in perspective, front and plan view, respectively, and in various vibratory positions;

FIGS. 12A and 12B show an optical element in the form of a light chopper in front and plan view, respectively;

FIG. 13 shows an optical element in the form of an opaque vane acting as a beam chopper; and FIG. 14 shows an optical element in the form of a vane having a slit therein providing a beam-chopping action.

Referring now to the drawing and more particularly to FIGS. 1 to 4, there is shown an optical switching mechanism in accordance with the invention, including a vibrator having a pair of identical flexible reeds 10 and 11, disposed in parallel relation, the feet thereof being anchored in a base plate 12. For this purpose, base 12, as best seen in FIG. 3, is provided with channels 12A and 12B to accommodate pressure blocks 13 and 14 which are pressed against the respective feet of reeds 10 and 11 by set screws 15 and 16.

Reeds 10 and 11 are preferably formed of a flexible metal having a low temperature coefficient of expansion to render the vibrator substantially insensitive to changes in ambient temperature. Suitable for this purpose are materials having a high mechanical Q, long fatigue life and a good temperature/elasticity coefficient, such as Ni-Span C or Elinvar.

The free ends of reeds 10 and 11 are ganged together by means of a headpiece 17 having slots therein to receive the ends, the ends being secured to the headpiece by screws 18 and 19. Mounted at corresponding intermediate positions on the reeds and projecting laterally therefrom in opposing directions are permanent magnets 20 and 21. Magnet 20 is received within a pick-up coil while magnet 21 is received within a drive coil 23, both coils being supported on a back plate 24 mounted on base 12. The mechanism is housed in a suitable container, only one wall 25 of which is shown in FIG. 1.

Mounted above headpiece 17 is a reflecting element 26 having a triangular formation to define an apex 27 and angled mirror faces 26A and 26B. Reflecting element 26, as will be later explained, functions to switch an incident beam of radiant energy in alternate directions.

The resonance frequency of the vibrator is determined by the length and stiffness of reeds 10 and 11 as well as by the mass of headpiece 17 and reflecting element 26. Pick-up coil 22, as shown in FIG. 5, is connected to the input of an amplifier 28, preferably of the solid-state type, whose output is coupled to drive coil 23, the combination of the coils and amplifier creating a positive feedback system serving to sustain the vibrator in oscillation at its resonance frequency in a well-known manner.

In lieu of a pick-up coil and magnet, one may attach a piezoelectric crystal 29 to one of the reeds to generate the pick-up voltage applied to the input of amplifier 28. The manner in which the vibrator is excited and sustained in vibration forms no part of the present invention, for any conventional means may be used for this purpose.

Referring now to FIG. 6, reflecting element 26 on the vibrator is shown in the static state. When the element is at rest, its orientation is such that the beam L from a source of radiant energy is in alignment with the optical axis O passing through apex 27 of the reflecting element. The diameter of the beam is much smaller than the width of the element and the rays from the beam are therefore divided between the angled faces 26A or 26B and are reflected thereby in alternate paths X and Y. The angle between these paths and optical axis O depends, of course, on the geometry of the reflecting element.

When the vibrator is excited, the two reeds 10 and 11, which are ganged together at their free ends, swing back and forth at a rate determined by the resonance characteristic of the vibrator. In the absence of ganging, the free ends of the reeds would normally swing back and forth in an arcuate path. However, because the free ends are ganged together by headpiece 17, they are constrained from describing an arcuate path and are forced to undergo a translating motion. This movement is similar to the head movement of a Siamese dancer whereby, as the neck is caused to sway, the head moves from side to side without tilting.

Consequently, when reeds 10 and 11 move toward the right, as shown in FIG. 7B, the intermediate portions thereof, which are subjected to an electromagnetic force, bend toward the right, whereas the feet portions of the reeds, which are anchored, maintain their stationary position while the reflecting element 26 mounted on headpiece 17 shifts toward the right without an arcuate component. Thus, beam L, as shown in FIG. 7B, now strikes only reflecting face 26A, and all of the beam energy is reflected along path X in the direction of a sensor or detector $D_X$.

Since the angle of reflection remains constant as the apex is displaced toward the right, during the entire right stroke of the vibrator, the beam is reflected without any scanning motion thereof. Similarly, as shown in FIGS. 8A and 8B, when reflecting element 26 translates toward the left, the entire beam is reflected without scanning motion along path Y to detector $D_Y$. FIGS. 9A and 9B show a full operating cycle in the course of which beam L alternates between paths X and Y to produce light pulses which are picked up by detectors $D_X$ and $D_Y$ whose outputs are in square-wave form inasmuch as all beam light is reflected and utilized.

Where a conventional vibrating scanning reflector is used to switch a beam impinging thereon from one direction to another, the reflected beam is intercepted by a detector for a relatively brief interval in the course of an operating cycle, for the beam is received only when the angle of the scanning mirror momentarily is in line with the detector. Consequently, with a scanning-type switching system, only a small portion of the available light or other form of radiant energy is utilized, whereas in the present invention the entire light output is exploited.

Again it must be emphasized that in the present invention, the reflected beam is perfectly stationary even though the reflecting element moves. For instance, assuming a laser beam having a 1mm diameter and a reflecting element 26 with faces 26A and 26B, each of which is 5mm wide, the peak-to-peak travel band of the reflecting element being 8mm, the reflected beam will remain stationary even though the mirror moves 4mm per face.

In some instances, it is desirable to provide right-angle beam-switching. This is accomplished, as shown in FIG. 10, by a reflecting element 26' whose faces 26A' and 26B' are each displaced 45° relative to the optical axis O. Hence the beam is reflected at right angles to the angle of incidence and the reflections in paths X and Y are in opposing directions.

It may also be desirable to provide a reference light pulse between successive switching pulses. This is accomplished, as seen in FIG. 10, by a flattened transparent apex 27', whereby beam L, at the zero position of the vibrator, passes through the reflecting element to produce a light pulse $P_R$ at a detector positioned on the optical axis. The square-wave pulses yielded by the detector which intercepts the reflected beam in the X path are represented by pulses $P_X$, while those produced in the Y path are represented by pulses $P_Y$, the latter being 180° out of phase with the former. The spurt of reference light passing through the reflector at the transparent apex provides a precise indication of the zero crossing.

Because the vibrator is adapted to translate an optical element without an accompanying scanning motion, one may, by the use of curved mirrors, obtain an optical scanning action. Thus, as shown in FIGS. 11A, B and C, a semicylindrical mirror 30 may be mounted on the vibrator, with the beam L in the static state of the vibrator, striking the mirror at its optical axis O which is at 360°, the curved face extending to 90° at one side of the axis and to 270° on the other. Thus at the rest position, beam 11 is reflected back on itself as shown in FIG. 11C. However, as the mirror shifts to the right (FIG. 11D), beam L is reflected from 360° to 270°, and as the mirror shifts to the left (FIG. 11E), beam L is reflected from 360° to 90°. The total scan, therefore, is 180°.

The optical element, as shown in FIGS. 12A and 12B, may take the form of a diffraction grating 31, intercepting light beam L, the grating being vibrated by ganged reeds 10 and 11. To produce a light-chopping action at a rate determined by the frequency of the vibrator, one may use an optical element in the form of an opaque vane 32 as shown in FIG. 13, to periodically intercept beam 11.

In FIG. 14, another form of light-chopper is shown, wherein vane 32 has a slit 33 formed therein. Beam L is chopped twice per vibrating cycle of the double-reed vibrator. In this instance, the peak-to-peak motion of the vane has to be twice the width of slit 33.

While there have been shown and described preferred embodiments of the invention, it will be appreciated that many changes and modifications may be made therein without departing from the essential spirit of the invention.

We claim:
1. An optical mechanism for modulating a beam of radiant energy, said mechanism comprising:
   A. a vibrator having a pair of parallel reeds of the same fixed length anchored at their feet, and a headpiece ganging together the free ends of the reeds,
   B. means to sustain said vibrator in vibration at its resonance frequency whereby as the reeds swing back and forth, the headpiece thereon is caused to undergo translation without an accompanying arcuate component, and
   C. an optical element mounted on said headpiece in a position to intercept said beam.
2. A mechanism as set forth in claim 1, wherein said element is a reflector having a triangular formation defined by an apex and a pair of angled faces, said apex in the static state of the vibrator being aligned with said beam whereby said beam is alternately reflected by said faces when the vibrator is in the dynamic state.
3. A mechanism as set forth in claim 2, wherein said apex is flattened and transparent to provide reference pulses.
4. A mechanism as set forth in claim 2, wherein said faces are disposed at right angles to each other to cause the beam to be reflected in opposing directions.
5. A mechanism as set forth in claim 1, wherein said reeds are electromagnetically driven at a point intermediate the free ends and the feet thereof.
6. A mechanism as set forth in claim 1, wherein said element is semicylindrical to effect a scanning action of a beam incident thereto.
7. A mechanism as set forth in claim 1, wherein said element is a diffraction grating having alternate bands which are opaque and transparent to produce a scanning or modulating action of a beam incident thereto.
8. A mechanism as set forth in claim 1, wherein said element is a vane for periodically chopping an incident beam.
9. A mechanism as set forth in claim 8, wherein said vane includes a slit to intercept said beam.

* * * * *